United States Patent
Zhang et al.

(10) Patent No.: US 12,231,295 B2
(45) Date of Patent: Feb. 18, 2025

(54) METHOD, DEVICE, AND SYSTEM FOR DETERMINING REQUIRED BANDWIDTH FOR DATA STREAM TRANSMISSION

(71) Applicant: Huawei Technologies Co., Ltd., Shenzhen (CN)

(72) Inventors: Jiayi Zhang, Beijing (CN); Tongtong Wang, Beijing (CN); Xinyuan Wang, Beijing (CN); Minwei Jin, Beijing (CN); Lihao Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 348 days.

(21) Appl. No.: 17/704,772

(22) Filed: Mar. 25, 2022

(65) Prior Publication Data
US 2022/0217051 A1    Jul. 7, 2022

Related U.S. Application Data

(63) Continuation of application No. PCT/CN2020/113461, filed on Sep. 4, 2020.

(30) Foreign Application Priority Data

Sep. 27, 2019 (CN) .......................... 201910927452.7
Nov. 8, 2019 (CN) .......................... 201911089128.9

(51) Int. Cl.
*H04L 41/0896* (2022.01)
*H04L 41/5006* (2022.01)
(Continued)

(52) U.S. Cl.
CPC ...... *H04L 41/0896* (2013.01); *H04L 41/5006* (2013.01); *H04L 43/0852* (2013.01); *H04L 43/0876* (2013.01)

(58) Field of Classification Search
CPC ............ H04L 41/0896; H04L 43/0852; H04L 41/5006
See application file for complete search history.

(56) References Cited

U.S. PATENT DOCUMENTS

| | | |
|---|---|---|
| 5,432,790 A | 7/1995 | Hluchyj et al. |
| 6,976,087 B1 | 12/2005 | Westfall et al. |

(Continued)

FOREIGN PATENT DOCUMENTS

| | | |
|---|---|---|
| CN | 101287102 A | 10/2008 |
| CN | 101729430 A | 6/2010 |

(Continued)

OTHER PUBLICATIONS

Alsahag Ali Mohammed et al, "Fair uplink bandwidth allocation and latency guarantee for mobile WiMAX using fuzzy adaptive deficit round robin," Journal of Network and Computer Applications, vol. 39, Mar. 31, 2014, 9 pages.

(Continued)

*Primary Examiner* — Jackie Zuniga Abad
(74) *Attorney, Agent, or Firm* — Conley Rose, P.C.

(57) ABSTRACT

A method includes: obtaining, by a control device, a service requirement latency of transmitting a data stream from a first network device to a second network device; obtaining, by the control device, a network device transmission latency on a forwarding path and a link transmission latency on the forwarding path; and determining, by the control device based on the service requirement latency of the data stream and the network device transmission latency and the link transmission latency on the path for forwarding the data stream, a required bandwidth for transmitting the data stream.

20 Claims, 7 Drawing Sheets

(51) Int. Cl.
*H04L 43/0852* (2022.01)
*H04L 43/0876* (2022.01)

(56) References Cited

U.S. PATENT DOCUMENTS

| | | | |
|---|---|---|---|
| 10,015,057 B2 | 7/2018 | Djukic et al. | |
| 2011/0141922 A1* | 6/2011 | Kotrla | H04L 43/0894 370/252 |
| 2011/0242974 A1 | 10/2011 | Das et al. | |
| 2016/0315841 A1 | 10/2016 | Kang et al. | |
| 2016/0380892 A1* | 12/2016 | Mahadevan | H04L 41/145 370/389 |
| 2018/0279368 A1* | 9/2018 | Butt | H04W 72/0453 |
| 2018/0323804 A1* | 11/2018 | Sadiq | H04L 1/0041 |
| 2021/0152465 A1* | 5/2021 | Han | H04L 45/24 |

FOREIGN PATENT DOCUMENTS

| | | |
|---|---|---|
| CN | 102761850 A | 10/2012 |
| CN | 105471764 A | 4/2016 |
| CN | 105635223 A | 6/2016 |
| CN | 105847176 A | 8/2016 |
| CN | 108632162 A | 10/2018 |
| CN | 108880946 A | 11/2018 |
| CN | 110139319 A | 8/2019 |
| EP | 1035751 A2 | 9/2000 |
| JP | 2000286896 A | 10/2000 |
| KR | 20100085164 A | 7/2010 |
| KR | 20160127511 A | 11/2016 |
| WO | 9508230 A1 | 3/1995 |

OTHER PUBLICATIONS

Yang Xinkai, et al, "A Bandwidth Allocation Policy Guaranteed QoS in High-speed Networks," Communications Technology, Issue 1999, with an English Abstract, 4 pages.

* cited by examiner

Network 100

| Field |
|---|
| Record number |
| Sequence number |
| Checksum |
| Data length |
| Application data |

FIG. 10

| | |
|---|---|
| Max_CommittedInformationRate | Unit32 |
| Max_CommittedBurstSize | Unit32 |
| MinFrameSize | Unit16 |
| MaxFrameSize | Unit16 |
| TSpecLimitEnable | boolean |

FIG. 11

| Scheduler-instance | | |
|---|---|---|
| Unit32 | Scheduler-instance-id | //r-w |
| Unit64 | committed-information-rate | //r-w |
| Unit32 | committed-burst-size | //r-w |

FIG. 12

METHOD, DEVICE, AND SYSTEM FOR DETERMINING REQUIRED BANDWIDTH FOR DATA STREAM TRANSMISSION

CROSS-REFERENCE TO RELATED APPLICATIONS

This is a continuation of International Patent Application No. PCT/CN2020/113461 filed on Sep. 4, 2020, which claims priority to Chinese Patent Application No. 201910927452.7 filed on Sep. 27, 2019 and Chinese Patent Application No. 201911089128.9 filed on Nov. 8, 2019. All of the aforementioned patent applications are hereby incorporated by reference in their entireties.

TECHNICAL FIELD

This application relates to the communications field, and in particular, to a method, a device, and a system for determining a required bandwidth for data stream transmission.

BACKGROUND

A bandwidth is used to describe traffic passing through a network per unit of time. Usually, in the network, the bandwidth is used to determine requirements of network services on network resources. For example, in a statistical multiplexing network, a network bandwidth is often deployed based on a traffic bandwidth. However, an ultra-reliable low-latency communication (uRLLC) of a fifth generation (5G) technology imposes a strict requirement on a service requirement latency. A common traffic bandwidth is used to guide network resource deployment, which cannot meet a requirement of the 5G technology for a low latency. For example, network resources are deployed based on an average traffic bandwidth. This solution can ensure that no packet loss occurs on the network when a buffer is sufficient. However, when the network is congested due to transient burst traffic, a transmission latency jitter occurs, and an end-to-end latency of a data stream is increased. Consequently, a uRLLC requirement of a 5G service cannot be met.

SUMMARY

This application provides a method for determining a required bandwidth for data stream transmission, to guide network resource deployment for a data stream that has a latency requirement, thereby ensuring a requirement for a low latency for end-to-end data stream transmission.

According to a first aspect, an embodiment of this application provides a method for determining a required bandwidth for data stream transmission. The method includes that a control device obtains a service requirement latency of end-to-end transmission of a data stream from a first network device to a second network device, where the first network device and the second network device are respectively devices at two ends on a path for forwarding the data stream. In this embodiment of this application, the service requirement latency may be referred to as a first latency. The control device obtains a network device transmission latency on the forwarding path and a link transmission latency on the forwarding path, where the forwarding path is a path through which the data stream is transmitted from the first network device to the second network device. In this embodiment of this application, a sum of the network device transmission latency and the link transmission latency on the forwarding path may be referred to as a second latency. The network device transmission latency on the forwarding path includes a network device transmission latency of one or more network devices on the forwarding path. For example, if three network devices are included on the forwarding path, the network device transmission latency on the forwarding path includes a sum of network device transmission latencies of the three network devices. The link transmission latency on the forwarding path is a link latency from the first network device to the second network device, and may also be referred to as an optical fiber latency on the forwarding path. The control device determines, based on the first latency and the second latency, a required bandwidth for transmitting the data stream.

According to the method, the control device determines the required bandwidth based on a latency requirement for end-to-end transmission of the data stream and the network device transmission latency and the link transmission latency on the forwarding path. The determined required bandwidth can meet a latency requirement of the data stream, thereby ensuring high reliability of service transmission.

In a possible implementation, the network device transmission latency includes one or more of the following latencies: a processing latency, an output latency, a preemption latency, and a scheduling latency of the network device on the forwarding path. According to the method, the network device transmission latency of the one or more network devices on the forwarding path can be flexibly determined from the foregoing latencies based on a requirement.

In a possible implementation, the required bandwidth determined by the control device satisfies the following condition: a latency of transmitting the data stream by the network device on the forwarding path along the forwarding path based on the determined required bandwidth is less than or equal to the first latency. According to the method, it can be ensured that the required bandwidth is used to transmit the data stream, to meet the service requirement latency of the data stream.

In a possible implementation, the control device obtains a third latency, where a value of the third latency is a difference between a value of the first latency and a value of the second latency. The third latency may be understood as a queue latency of transmitting the data stream by the network device. The queue latency is closely related to a bandwidth of the network device. A larger bandwidth of the network device indicates a lower queue latency. The control device may obtain a value of the required bandwidth based on the third latency. For example, the control device obtains, based on a time length for which the data stream is sent in a predetermined period and an average rate at which the data stream is sent, a quantity of data streams sent in the predetermined period. The control device may calculate the required bandwidth for the data stream based on the quantity of data streams and the third latency.

In a possible implementation, the control device obtains a burst length of the data stream, and obtains the required bandwidth by using the following relationship:

$$B_d = b/(d_{obj} - d_{fix}).$$

$B_d$ indicates the required bandwidth for transmitting the data stream. b indicates the burst length of the data stream. $d_{obj}$ indicates the service requirement latency of end-to-end transmission of the data stream, that is, the first latency. $d_{fix}$ indicates the sum of the network device transmission latency and the link transmission latency on the forwarding path, that is, the second latency. The burst length of the data stream may also be referred to as a burst quantity of the data stream.

In the foregoing method, a value obtained based on a difference between $d_{obj}$ and $d_{fix}$ indicates a network device queue latency on the forwarding path. The control device obtains, based on a quotient of the burst length of the data stream and the network device queue latency, the required bandwidth for transmitting the data stream. The network device on the forwarding path transmits the data stream by using the required bandwidth, so that not only burst traffic can be smooth, but also it can be ensured that transmission of the data stream meets a constraint of the end-to-end service requirement latency in the case of the burst traffic.

In a possible implementation, the network device on the forwarding path includes one or more network devices configured to forward the data stream. The one or more network devices do not include the first network device or the second network device, or the one or more network devices include the first network device, or the one or more network devices include the second network device, or the one or more network devices include the first network device and the second network device.

In an actual scenario, the control device needs to consider the network device transmission latency and the link transmission latency on the forwarding path as factors for solving the required bandwidth. Therefore, the control device needs to determine a range of network devices on the forwarding path. The determined range of network devices on the forwarding path varies with an actual scenario. For example, if the network devices, at the two ends, for forwarding the data stream are respectively a source end device and a destination end device of the data stream, the one or more network devices on the forwarding path do not include the devices, at the two ends, of the data stream. If the devices at the two ends of the forwarding path are edge forwarding devices in a subnet, the devices at the two ends belong to the plurality of network devices on the forwarding path. If one of the devices at the two ends of the forwarding path is an edge forwarding device, the device belongs to the one or more network devices on the forwarding path. According to the method, the network device on the path for forwarding the data stream may be selected and determined based on different network scenarios, to help the control device more accurately determine the required bandwidth.

In a possible implementation, a manner in which the control device obtains the burst length of the data stream may include any one of the following manners.

The control device obtains the burst length from the network device on the forwarding path, or the control device obtains a burst rate of the data stream and a burst time of the data stream, and uses a value of a product of the burst rate and the burst time as the burst length, or the control device obtains a length of a packet sent in the data stream in a specified period and a quantity of sent packets, and uses a value of a product of the packet length and the quantity of packets as the burst length.

According to the method, a plurality of manners that may be used to obtain the burst length of the data stream are provided.

In a possible implementation, the control device may obtain the first latency or the second latency by using one of the following packets, for example, a Multiple Registration Protocol (MRP) packet, a Link-local Registration Protocol (LRP) packet, a Network Configuration Protocol (NETCONF) packet, a Representational State Transfer Network Configuration Protocol (RESTCONF) packet, a Simple Network Management Protocol (SNMP) packet, and a management information base (MIB) packet.

In a possible implementation, before the control device obtains the second latency, the control device determines, based on the service requirement latency of the data stream, the forwarding path for transmitting the data stream.

In a possible implementation, after the control device determines the required bandwidth, the control device sends indication information to the one or more network devices on the forwarding path, where the indication information carries the value of the required bandwidth for the data stream. The indication information may be used to indicate the network device on the forwarding path to transmit the data stream based on the required bandwidth.

In a possible implementation, after the control device determines the required bandwidth, the control device sends indication information to the network device on the forwarding path, where the indication information is used to indicate the network device on the path to reserve a bandwidth for the data stream based on the required bandwidth, and the reserved bandwidth is greater than or equal to the required bandwidth.

In a possible implementation, the control device may select and determine, based on the required bandwidth, the network device configured to transmit the data stream. For example, when there is a plurality of forwarding paths for the data stream, the control device may select, based on the required bandwidth, an appropriate network device and a path for forwarding the data stream, where the selected network device is a network device that can provide a bandwidth equal to the required bandwidth to transmit the data stream. According to the method, the control device may select, based on the required bandwidth, a network device that meets a requirement to forward the data stream, thereby ensuring a low latency for data stream transmission.

In a possible implementation, the control device sends the indication information to the network device on the forwarding path by using a Centralized User Configuration (CUC) device, where the indication information carries the required bandwidth for the data stream.

In a possible implementation, the value of the required bandwidth is less than or equal to a maximum bandwidth of the network device on the forwarding path.

According to a second aspect, an embodiment of this application provides a method for determining a required bandwidth for data stream transmission. In the method, a control device obtains a service requirement latency of transmitting a data stream from a first network device to a second network device. In this embodiment of this application, the service requirement latency may be referred to as a first latency. The control device obtains a network device transmission latency of each network device on a forwarding path and a link transmission latency of the data stream on the forwarding path. The forwarding path is a path through which the data stream is transmitted from the first network device to the second network device, and the link transmission latency on the forwarding path refers to a link transmission latency of the data stream on the path from the first network device to the second network device, and may also be referred to as an end-to-end link transmission latency of the data stream. In this embodiment of this application, a transmission latency of a single network device on the forwarding path may be referred to as a second latency. The control device obtains, based on the first latency, the second latency, and the link transmission latency, a required bandwidth for transmitting the data stream by the single device.

In a possible implementation, the control device obtains, based on the first latency, a service requirement latency of transmitting the data stream by each network device on the forwarding path. For example, the control device divides the first latency by a quantity of network devices on the forwarding path, to obtain the service requirement latency of transmitting the data stream by each network device. The control device may alternatively allocate the first latency to each network device on the forwarding path in proportion based on a requirement, to obtain the service requirement latency of transmitting the data stream by each network device. According to the method, the control device may flexibly determine, based on a requirement, the service requirement latency of transmitting the data stream by each forwarding device on the forwarding path.

In a possible implementation, the transmission latency of the single network device includes one or more of the following latencies: a processing latency, an output latency, a preemption latency, and a scheduling latency of the single network device.

In a possible implementation, a latency of transmitting the data stream by the network device on the forwarding path along the forwarding path based on the required bandwidth is less than or equal to the first latency.

In a possible implementation, the control device obtains a value of the required bandwidth based on a difference between a value of the first latency and a value of the second latency that is related to the link transmission latency.

In a possible implementation, the method further includes that the control device obtains a burst length of the data stream.

That the control device determines, based on the first latency and the second latency, a required bandwidth for transmitting the data stream includes that the control device obtains the required bandwidth by using the following relationship:

$$B_d = b/(d_{obj-per} - d_{device}).$$

$B_d$ indicates the required bandwidth of the single network device on the forwarding path. b indicates the burst length of the data stream. $d_{obj-per}$ indicates the service requirement latency of the single network device on the forwarding path. $d_{device}$ indicates the second latency, that is, the network device transmission latency of the single network device on the forwarding path. A corresponding value of $d_{obj-per}$ may be obtained based on a requirement. For example, the control device obtains a third latency based on a difference between the first latency and the link transmission latency, and then control device allocates the third latency to each network device on the forwarding path in a specific proportion, and then obtains the service requirement latency of the single network device, that is, obtains $d_{obj-per}$.

According to the foregoing method, the control device may determine, for the single network device, the bandwidth for transmitting the data stream, so that the network device is more flexibly deployed when a constraint of the service requirement latency of transmitting the data stream is met.

In a possible implementation, the network device on the forwarding path includes one or more network devices configured to forward the data stream. The one or more network devices do not include the first network device or the second network device, or the one or more network devices include the first network device, or the one or more network devices include the second network device, or the one or more network devices include the first network device and the second network device.

In a possible implementation, a manner in which the control device obtains the burst length of the data stream may include any one of the following manners.

The control device receives the burst length from the network device on the forwarding path, or the control device obtains a burst rate of the data stream and a burst time of the data stream, and uses a value of a product of the burst rate and the burst time as the burst length, or the control device obtains a packet length of a packet sent in the data stream in a specified period and a quantity of sent packets, and uses a value of a product of the packet length and the quantity of packets as the burst length.

In a possible implementation, before the control device obtains the second latency, the control device determines, based on the service requirement latency of the data stream, the path for transmitting the data stream.

In a possible implementation, after the control device determines the required bandwidth, the control device sends indication information to the network device on the forwarding path, where the indication information carries the required bandwidth of the data stream. The indication information may be used to indicate the network device on the forwarding path to transmit the data stream based on the required bandwidth.

In a possible implementation, after the control device determines the required bandwidth, the control device sends indication information to the network device on the forwarding path, where the indication information is used to indicate the network device on the forwarding path to reserve a bandwidth for the data stream based on the required bandwidth, and the reserved bandwidth is greater than or equal to the required bandwidth. The network device may be a network device that sends the network device transmission latency to the control device.

In a possible implementation, the control device may select and determine, based on the required bandwidth, the network device configured to transmit the data stream. For example, when there is a plurality of forwarding paths for the data stream, the control device may select, based on the required bandwidth, an appropriate network device, that is, a network device that can provide a bandwidth equal to the required bandwidth to transmit the data stream. According to the method, the control device may select, based on the required bandwidth, a network device that meets a requirement to forward the data stream, thereby ensuring a low latency for data stream transmission.

According to a third aspect, an embodiment of this application provides a control device configured to perform the method in any one of the first aspect or the possible implementations of the first aspect. Further, the network device includes units configured to perform the method in any one of the first aspect or the possible implementations of the first aspect.

According to a fourth aspect, an embodiment of this application provides a control device configured to perform the method in any one of the second aspect or the possible implementations of the second aspect. Further, the network device includes units configured to perform the method in any one of the second aspect or the possible implementations of the second aspect.

According to a fifth aspect, an embodiment of this application provides a control device. The control device includes a processor, a communications interface, and a memory. The memory may be configured to store program code. The processor is configured to invoke the program code in the memory to perform the method in any one of the first aspect or the possible implementations of the first aspect or any one of the second aspect or the possible implementations of the second aspect. For details, refer to detailed descriptions in the method example. Details are not described herein again.

According to a sixth aspect, an embodiment of this application provides a system for sending a service packet. The system includes a sending device, a forwarding device, and a control device. The sending device is configured to send an end-to-end service requirement latency of a data stream to the control device. The forwarding device is configured to send an end-to-end network device transmission latency on a forwarding path and a link transmission latency on the forwarding path to the control device. The control device is configured to determine, based on the end-to-end service requirement latency of the data stream, the end-to-end network device transmission latency on the forwarding path, and the link transmission latency on the forwarding path, a required bandwidth for transmitting the data stream.

According to a seventh aspect, an embodiment of this application provides a computer-readable medium, including instructions. When the instructions are executed on a computer, the computer is enabled to perform the method in any one of the first aspect or the possible implementations of the first aspect, or the method in any one of the second aspect or the possible implementations of the second aspect.

BRIEF DESCRIPTION OF DRAWINGS

FIG. 10 is a schematic diagram of an LRP data unit (LRPDU) packet format according to an embodiment of this application;

FIG. 11 is a schematic diagram of conversion of information carried in a TLV into a yet another next generation (YANG) model according to an embodiment of this application;

FIG. 12 is a schematic diagram of a YANG model carrying a required bandwidth for transmitting a data stream according to an embodiment of this application;

DESCRIPTION OF EMBODIMENTS

Figure 1:
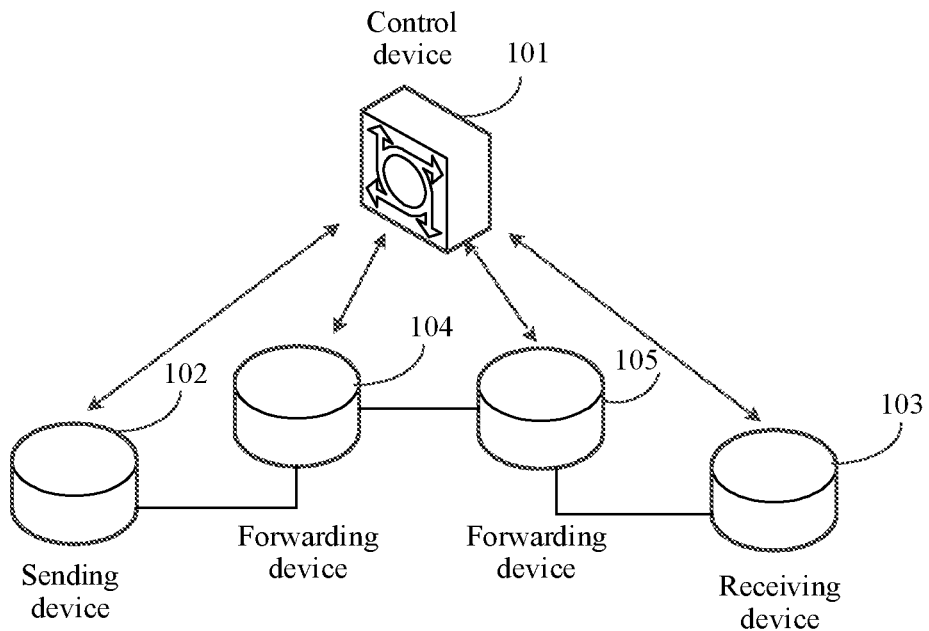
FIG. 1 is a schematic diagram of a scenario in which a required bandwidth for transmitting a data stream is determined according to an embodiment of this application.

The following describes the embodiments of this application with reference to the accompanying drawings.

For a data stream of an Internet Protocol (IP) network, a bandwidth is often used to collect statistics on a size of the data stream, and a value of the bandwidth is related to a feature and an observation period of the data stream. For example, an average bandwidth is used to describe a data stream that is stable in a long time, and a relatively long observation period is required. A peak bandwidth is used to describe a transient maximum value of a data stream, and a relatively short observation period is required. A millisecond-level or microsecond-level time unit may be selected based on a feature of the data stream, to collect statistics on the data stream.

However, the foregoing network deployed based on the average bandwidth or the peak bandwidth can hardly meet a requirement of uRLLC for a low latency. First, when a data stream has a burst feature, the average bandwidth differs greatly from the peak bandwidth, and the peak bandwidth also differs greatly with different values of the observation period. Consequently, it is difficult to use a single bandwidth value to reflect the feature of the data stream. In addition, a bandwidth refers to statistics on data streams per unit of time, and a value of the bandwidth is not directly related to a network transmission latency requirement.

In view of this, this application provides a method, a device, and a system for determining a bandwidth for data stream transmission, so that bandwidth values for different data streams can be more accurately determined when a latency requirement is met. In the solutions, a latency requirement for transmitting a data stream, a network device transmission latency, and a link transmission latency are used as parameters, to determine a required bandwidth for transmitting the data stream by a network device. In other words, under a constraint condition that the latency requirement of the data stream is met, the required bandwidth for transmitting the data stream by the network device is determined, and the determined required bandwidth is delivered to the network device as a delay reliable bandwidth (DRB) for transmitting the data stream, to deploy a network. The method may be used to guide network resource deployment for a data stream that has a latency requirement, and determine, based on the latency requirement of the data stream, a bandwidth for transmitting the data stream, to implement a low latency and high reliability for a service, and provide technical support for development of a 5G service.

Before the specific solutions of this application are described, the following first describes and explains terms in this application.

A required bandwidth for a data stream in this application is used to describe a reliable bandwidth required for transmitting the data stream when a latency requirement of the data stream is met. The required bandwidth of the data stream may also be referred to as a DRB. The DRB may be used to guide network resource configuration, to provide a deterministic and reliable latency guarantee for a data stream of a uRLLC service. For example, in industrial automation network application, if a latency requirement for end-to-end transmission of a data stream is that a 2-millisecond (ms) reliability (a probability of successful data transmission within the latency requirement of the data stream) requirement is 100%, a maximum latency of transmitting the data stream by a network device by using the DRB cannot exceed 2 ms. In this application, the DRB or the required bandwidth may be indicated by $B_d$.

A service requirement latency of the data stream in this application is an acceptable maximum latency of end-to-end transmission of the data stream, and may also be referred to as a bounded latency of the data stream or a latency requirement for transmitting the data stream. For example, a value of the acceptable maximum latency of end-to-end transmission of the data stream is 2 ms, and the bounded latency of the data stream or the latency requirement of the data stream is 2 ms. In this application, the bounded latency or the service requirement latency of the data stream may be indicated by $d_{obj}$. The term "end-to-end" is used to describe two ends of a path for transmitting the data stream. For example, the transmission path of the data stream is a path from a first network device to a second network device, and end-to-end transmission of the data stream means that the data stream is transmitted from one end, that is, the first network device to the other end, that is, the second network device.

YANG in this application is a data modeling language, used to model configuration data, status data, a remote procedure call, and a network management protocol notification. For specific descriptions of YANG, refer to related chapters in Requirement For Comments (RFC) 6020 and RFC 7950. For example, the network device may configure and send data by using a NETCONF YANG model and a RESTCONF YANG model. The YANG model can describe data in an Extensible Markup Language (XML) format or a JAVASCRIPT object notation (JSON) format. For example, the YANG model may be used to carry a parameter corresponding to a forwarding latency or a DRB of the network device.

The following describes a possible application scenario of this application with reference to FIG. 1. A network 100 in FIG. 1 includes a control device 101 and network devices 102 to 105. In a possible design, the network devices 102 to 105 may be respectively a sending device 102, forwarding devices 104 and 105, and a receiving device 103 of a data stream. For example, the sending device 102 may be a source end device for sending the data stream, and the data stream is forwarded by the forwarding devices 104 and 105, and is received by a destination end device 103. The control device 101 may exchange information with one or more of the sending device 102, the forwarding device 104, the forwarding device 105, or the receiving device 103 by using a user-network interface (UNI), a NETCONF, or a RESTCONF.

The control device 101 has a data processing capability or a computing capability. As shown in FIG. 1, the control device 101 may be an independent network device, that is, physically independent of the network devices 102 to 105 in the network 100, and centrally manages one or more of the network devices 102 to 105. Alternatively, the control device 101 and another network device may be integrated on a same network device. For example, the control device 101 and the sending device 102 are integrated on a same network device. Alternatively, a function of the control device 101 may be split into a plurality of sub-functional units, and the plurality of sub-functional units may be distributed on the network devices 102 to 105. A physical form and a deployment manner of the control device 101 are not limited in this application, provided that a function of interacting with one or more of the network devices 102 to 105 in this application can be implemented.

Each of the sending device 102, the receiving device 103, or the forwarding devices 104 and 105 may be an independent network device, or may be integrated with the control device 101 on one device, and may be selected and designed based on a specific scenario requirement. This is not limited in this application.

In an example, if the data stream needs to traverse a plurality of subnets in a transmission process from the source end device to the destination end device, the sending device 102 may be a network device that has a forwarding function and that is located at an edge of one of the subnets. For example, when a path for transmitting the data stream is divided into different subnets based on network segments, the sending device 102 is an edge forwarding device of one of the subnets. Alternatively, when a path for transmitting the data stream is distributed in a plurality of subdomains in Time-Sensitive Networking (TSN), the sending device 102 is an edge forwarding device in one of the subdomains. The forwarding devices 104 and 105 may be network devices that have a data stream forwarding function, such as switches or routers. The receiving device 103 may be a receive-end network device of traffic, and has a traffic receiving function.

In an example, the network 100 may further include a CUC device. The CUC device separately establishes connections to the network devices 102 to 105, and may be configured to manage or configure the network devices 102 to 105. The CUC device serves as a proxy for the network devices 102 to 105 to exchange information with the control device 101.

The network scenario provided in FIG. 1 may be a 5G uRLLC service scenario, which is further, for example, a scenario in which a bounded latency guarantee is provided for a smart grid differential protection service, an industrial automation scenario, a vehicle network scenario, or a scenario in which a smart factory, a bounded latency is provided for a sensor collection data stream, an industrial control data stream, video surveillance traffic, and the like based on a wired Ethernet or a wireless network. In these scenarios, for different data stream types, there may be different service-level agreements (SLAs) in a network. Therefore, the control device needs to properly coordinate an available resource and a service requirement based on a latency requirement of the data stream, and properly allocate and reserve a network resource. According to the solution for determining a bandwidth for data stream transmission that is provided in this application, a network resource is configured, to provide a differentiated SLA guarantee.

Figure 2:
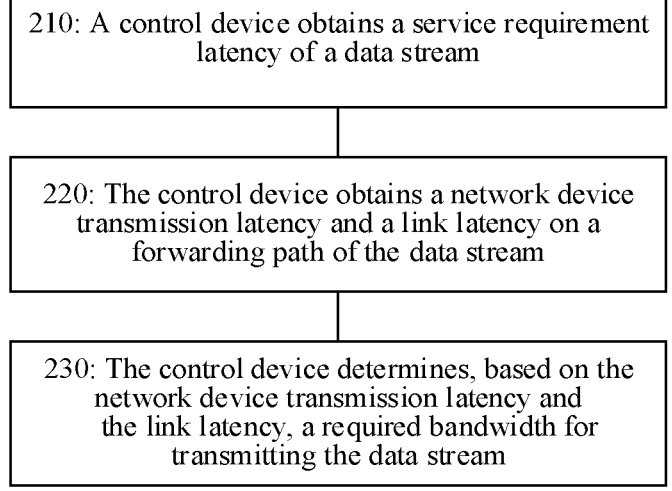
FIG. 2 is a schematic flowchart of a method for determining a required bandwidth for data stream transmission according to an embodiment of this application.

FIG. 2 is a schematic flowchart of a method for determining a required bandwidth for data stream transmission according to this application. The method includes obtaining a service requirement latency of a data stream, obtaining a network device transmission latency and a link transmission latency on a forwarding path, and determining a required bandwidth for the data stream. A control device in FIG. 2 may be the control device 101 in FIG. 1, and a network device on the forwarding path in FIG. 2 may be one or more of the network devices 101 to 105 in FIG. 1. The following separately explains and describes the foregoing three steps.

Step 210: The control device obtains the service requirement latency of the data stream.

On the one hand, the control device may obtain the service requirement latency of the data stream from the control device. For example, the control device may obtain, by using a correspondence between a data stream and a service requirement latency that is stored by the control device, the service requirement latency corresponding to the data stream. On the other hand, the control device may alternatively receive the service requirement latency that is of the data stream and that is sent by another network device. For example, the control device may first determine, based on obtained network topology information, the path for forwarding the data stream and the one or more network devices on the forwarding path. Then, the control device obtains the service requirement latency of the data stream from the network device on the forwarding path. For example, with reference to FIG. 1, the sending device 101 may directly send the service requirement latency of the data stream to the control device.

For example, when the network device on the transmission path sends the service requirement latency of the data stream to the control device, the control device may send, to the control device by using a UNI, a packet that carries the service requirement latency of the data stream, for example, include the service requirement latency of the data stream in a MRP packet, a LRP packet, a NETCONF packet, a RESTCONF packet, or a MIB packet.

In an example, the network device on the transmission path may alternatively send the service requirement latency of the data stream to the control device by using a CUC device.

The network device may alternatively send, to the control device by using a CUC device, a packet that carries the service requirement latency of the data stream.

The service requirement latency of the data stream may be understood as a maximum latency allowed for end-to-end transmission of the data stream. For example, if end-to-end devices are respectively a first network device and a second network device, the service requirement latency of the data stream is a maximum required latency allowed for the data stream to arrive at the second network device from the first network device. When the first network device and the second network device are respectively a source end device and a destination end device of the data stream, the control device may obtain the service requirement latency of the data stream from the first network device. For example, in TSN, a transmit end (talker) directly sends the service requirement latency of the data stream to the control device, or sends the service requirement latency of the data stream to the control device by using the CUC device. When the first network device is an edge forwarding device in a subnet for transmitting the data stream, any network device on the path for forwarding the data stream may send the service requirement latency of the data stream to the control device.

The control device may receive a service requirement latency of one or more different data streams. Different data streams may be distinguished based on 4-tuple, 5-tuple, or 7-tuple information of the data streams. For example, different data streams are distinguished based on source IP addresses, destination IP addresses, source ports, and destination ports of the data streams, or different data streams are distinguished based on source IP addresses, destination IP addresses, protocol numbers, source ports, and destination ports of the data streams, or different data streams are distinguished based on source IP addresses, destination IP addresses, protocol numbers, service types, interface indexes, source ports, and destination ports of the data streams. Data streams may alternatively be distinguished based on other features. For example, whether data streams are a same data stream is distinguished depending on whether transmission paths of the data streams are the same, and data streams on a same transmission path are a same data stream. Data streams may alternatively be distinguished depending on whether the data streams have a same quality of service (QoS) parameter, for example, depending on whether the data streams have a same latency, jitter, or throughput, and data streams having a same QoS parameter are a same data stream. The foregoing distinguishing features may be further combined to distinguish whether data streams are a same data stream.

Step 220: The control device obtains the network device transmission latency and the link transmission latency on the forwarding path of the data stream.

For ease of description below, the forwarding path for end-to-end transmission of the data stream may be referred to as a first path. The network device transmission latency on the first path may include one or more of a processing latency, an output latency, a preemption latency, or a scheduling latency of the one or more network devices on the first path. The link transmission latency on the first path is a latency of end-to-end transmission of the data stream on the first path, and may also be referred to as an optical fiber latency on the first path.

The control device obtains a sum of an accumulated value of a network device transmission latency of the one or more network devices on the forwarding path and an accumulated value of the link transmission latency on the forwarding path. With reference to FIG. 1, for example, the forwarding devices 104 and 105 are included on the forwarding path for transmitting the data stream, and the network device transmission latency on the forwarding path is a sum of network device transmission latencies of the forwarding device 104 and the forwarding device 105. The link transmission latency on the forwarding path is a sum of transmission latencies of all links on the forwarding path. In FIG. 1, the link transmission latency on the forwarding path is a sum of transmission latencies of all links, between the sending device 102 and the receiving device 103, for transmitting the data stream along the forwarding path.

In an example, a network device forwarding latency on the first path includes one or a combination of more of the following latencies: the processing latency of the network device on the first path, the output latency of the network device on the first path, the preemption latency of the network device on the first path, or the scheduling latency of the network device on the first path. For example, the network device forwarding latency on the first path includes the output latency of the network device on the first path and the processing latency of the network device on the first path. The network device forwarding latency on the first path may be any one of the foregoing latency parameters or any combination of the foregoing latency parameters. A combination manner is not limited in this application.

Figure 4:
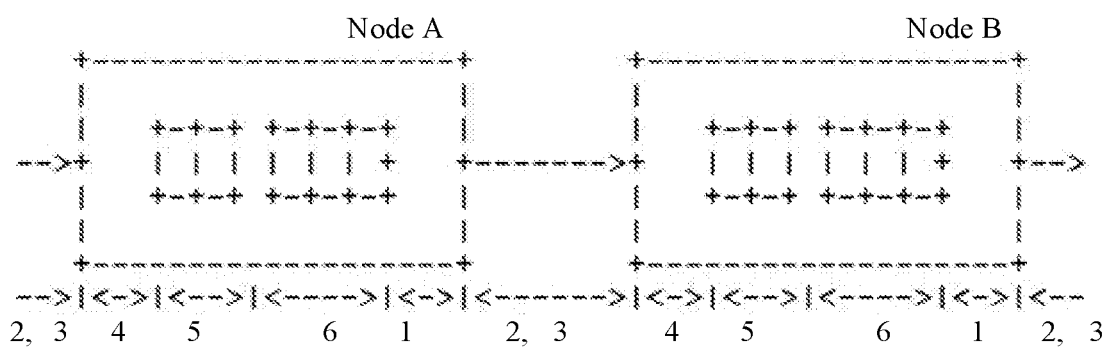
FIG. 4 is a schematic diagram of a structure of a latency of transmitting a data stream by a network device according to an embodiment of this application.

For example, FIG. 4 is a schematic diagram of a network device transmission latency and a link transmission latency according to this application. In FIG. 4, a node A and a node B are included, and a transmission direction of a data stream is from the node A to the node B. A network device transmission latency and a link transmission latency of the data stream from the node A to the node B includes a part shown by a digit in FIG. 4. In FIG. 4, a digit 1 represents a network device output latency, a digit 2 represents a link transmission latency, a digit 3 represents a preemption latency, a digit 4 represents a network device processing latency, a digit 5 represents a scheduling latency, and a digit 6 represents a queue latency. The network device transmission latency on the forwarding path includes a sum of a transmission latency of the node A, a transmission latency of the node B, and the link transmission latency. A transmission latency of a single network device on the forwarding path may be any one or any combination of 1, 3, 4, and 5, for example, a transmission latency of a single network device on the first path is a sum of 1, 3, 4, and 5, or may include only 4. The network device transmission latency on the forwarding path is N times the determined transmission latency of the single network device, and N is a quantity of network devices on the forwarding path.

In an example, the network device on the first path or the forwarding path includes one or more network devices configured to forward the data stream. The one or more network devices do not include devices at two ends of the forwarding path, or the one or more network devices include only either of devices at two ends of the forwarding path, or the one or more network devices include devices at two ends of the forwarding path. The control device may receive a network device transmission latency and a link transmission latency on the forwarding path that are sent by any one or more of the foregoing forwarding devices.

The control device needs to consider the network device transmission latency and the link transmission latency on the forwarding path as factors for solving the required bandwidth. Therefore, the control device needs to determine a range of network devices on the forwarding path. The determined range of network devices on the forwarding path varies with an actual scenario. For example, if the network devices, at the two ends, for forwarding the data stream are respectively a source end device and a destination end device of the data stream, the one or more network devices on the forwarding path do not include the devices, at the two ends, of the data stream. If the devices at the two ends of the forwarding path are edge forwarding devices in a subnet, the devices at the two ends belong to the plurality of network devices on the forwarding path. If one of the devices at the two ends of the forwarding path is an edge forwarding device, the device belongs to the one or more network devices on the forwarding path. According to the method, the network device on the path for forwarding the data stream may be selected and determined based on different network scenarios, to help the control device more accurately determine the required bandwidth.

In addition, the control device needs to configure a network resource for the forwarding device on the path for transmitting the data stream. As shown in FIG. 1, if the sending device 102 is a source end device of the data stream, and the receiving device 103 is a destination end device of the data stream, the control device may not configure bandwidth resources for the source end device and the destination end device of the data stream. Therefore, the network device on which the control device needs to perform bandwidth configuration does not include the sending device 102 or the receiving device 103. If the sending device 102 and the receiving device 103 are edge devices in a subnet and are not a source end device and a destination end device of the data stream, the control device may alternatively calculate and configure required bandwidths for both the sending device 102 and the receiving device 103.

The control device may receive the network device transmission latency and the link transmission latency on the forwarding path by using an MRP packet, an LRP packet, a NETCONF packet, a RESTCONF packet, or a MIB packet. For example, the control device may use a YANG model to carry the network device transmission latency and the link transmission latency on the forwarding path, and send the YANG model to the control device by using a NETCONF packet or a RESTCONF packet.

Step 230: The control device determines the required bandwidth for transmitting the data stream.

The control device determines, based on the service requirement latency of the data stream and the network device transmission latency and the link transmission latency on the forwarding path, the required bandwidth for transmitting the data stream. Optionally, a time length for which the network device on the forwarding path performs end-to-end transmission on the data stream by using the required bandwidth is less than or equal to the service requirement latency of the data stream.

Figure 5:
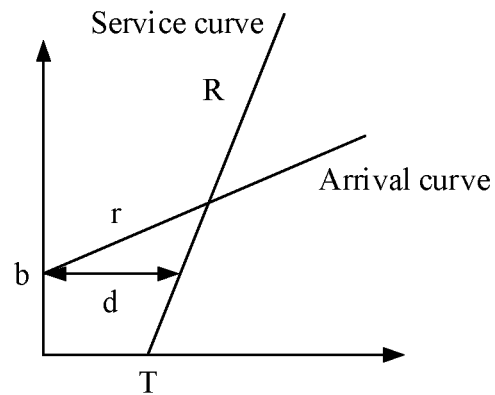
FIG. 5 is a schematic diagram of a service curve and an arrival curve of a data stream according to an embodiment of this application.

In an example, the control device may determine the required bandwidth for the data stream based on an arrival curve and a service curve. The arrival curve α is used to describe an accumulated maximum quantity (bit or byte) of data streams sent within a time t, and the service curve is used to describe an accumulated service quantity (bit or byte) of data streams sent within the time t. As shown in FIG. 5, a schematic diagram of determining the required bandwidth for the data stream is provided. The data stream conforms to the arrival curve $\alpha(t)=b+rt$, b is a burst length of the data stream, and r is an average rate of the data stream. The burst length of the data stream refers to a length of burst traffic of the data stream. For example, when the data stream is sent by using a token bucket, the burst length is a committed burst size (CBS). This embodiment of this application is not limited to a manner of sending the data stream by using the token bucket. The data stream conforms to the service curve $\beta(t)=R(t-T)$, R is a sending rate provided by the network device on the forwarding path for the data stream, T is a sum of network device transmission latency and the link transmission latency on the forwarding path, and the service curve may be used to describe one forwarding device or a plurality of cascaded forwarding devices. The control device may obtain a feasible solution of a bandwidth variable R by using the following formula 1, where p is used to describe a probability that the data stream is reliably transmitted in a network (without a packet loss) and the service requirement latency of the data stream is met, for example, a specific service requires that at a probability of 99.99%, the transmission latency does not exceed 20 ms. A default value of an accuracy requirement p for transmitting the data stream may be p=1, that is, the service requirement latency of the data stream needs to be 100% met. A solving method may be network calculus or the like. For example, a maximum horizontal distance between the arrival curve and the service curve is solved as an upper bound of the latency, that is, the service requirement latency of the data stream. The determined required bandwidth R is less than or equal to the maximum bandwidth of the network device on the forwarding path.

$$h\_max(a(b,r,t),\beta(R,T,t),p) \le d_q \quad \text{(Formula 1)}$$

$$R_{min} \le R \le R_{max}$$

In an example, for the data stream, the required bandwidth for the data stream may be obtained based on a queue latency. The queue latency of the data stream may be $d_q = d_{obj} - d_{fix}$. $d_{obj}$ indicates the end-to-end service requirement latency of the data stream. $d_{fix}$ indicates the network device transmission latencies and the link transmission latencies of all the network devices that forward the data stream on the forwarding path. For example, if there are two network devices on the forwarding path, $d_{fix}$ includes the link transmission latency of end-to-end transmission of the data stream and transmission latencies of the two network devices.

In an example, a value of the required bandwidth for the data stream is obtained based on a relational expression $B_d=b/(d_{obj}-d_{fix})$. $B_d$ indicates the value of the required bandwidth. b indicates a value of the burst length. $d_{obj}$ indicates the service requirement latency of the data stream. $d_{fix}$ indicates the network device transmission latency and the link transmission latency on the forwarding path. A difference between $d_{obj}$ and $d_{fix}$ indicates a network device queue latency for the burst length on the forwarding path in a physical sense. The network device on the forwarding path transmits the data stream by using the required bandwidth, so that the service requirement latency of the data stream can be met. In addition, the method can further ensure that transmission of the data stream meets a constraint of the service requirement latency in the case of the burst traffic.

For example, the burst length b may be sent by the network device on the forwarding path to the control device. For a specific sending manner, refer to the manner of sending the service requirement latency of the data stream in step 210. The burst length of the data stream may alternatively be obtained based on a burst length $b=t_p r_p$. $r_p$ indicates a burst rate of the data stream, and $t_p$ indicates a burst time of the data stream. The burst length of the data stream may alternatively be obtained based on a burst length $b=N_L L$. $N_L$ indicates a quantity of data streams with a maximum packet length L that are sent in a specified period. L indicates a longest packet of the data stream. For accurate calculation, the burst length of the data stream may alternatively be obtained based on a burst length $b=2N_L L$, that is, the burst length is calculated by using a quantity of longest packets in two periods.

For a manner in which the control device obtains the feature information of the data stream, refer to the manner of obtaining the service requirement latency of the data stream in step 210. For example, the control device may obtain, by using the packets listed in step 210, the burst length b, the burst rate $r_p$, or the burst time $t_p$ of the data stream, the average rate r at which the data stream is transmitted, the maximum packet length L of the data stream sent in the specified period, the quantity of data streams with the maximum packet length L that are sent in the specified period, or the accuracy requirement p for transmitting the data stream. The accuracy requirement p is an accuracy requirement for transmitting the data stream, and may also be referred to as a reliability requirement for transmitting the data stream. For a method for receiving the parameter by the control device, refer to the method for receiving the service requirement latency of the data stream by the control device in step 210. Details are not described herein again. The control device may obtain the arrival curve α based on other information of the data stream.

In an example, the control device sends indication information to the network device on the path by using a CUC device.

In an example, the control device sends indication information to the network device on the forwarding path. The indication information carries the required bandwidth. As shown in FIG. 12, a YANG model that carries the required bandwidth for the data stream is provided. The indication information is used to indicate the network device on the forwarding path to transmit the data stream based on the required bandwidth, or is used to indicate the network device on the forwarding path to reserve a bandwidth for the data stream based on the required bandwidth. The control device may send the required bandwidth for the data stream to a next-hop device that sends the data stream, or may send the required bandwidth for the data stream to all the network devices on the forwarding path.

Figure 3:
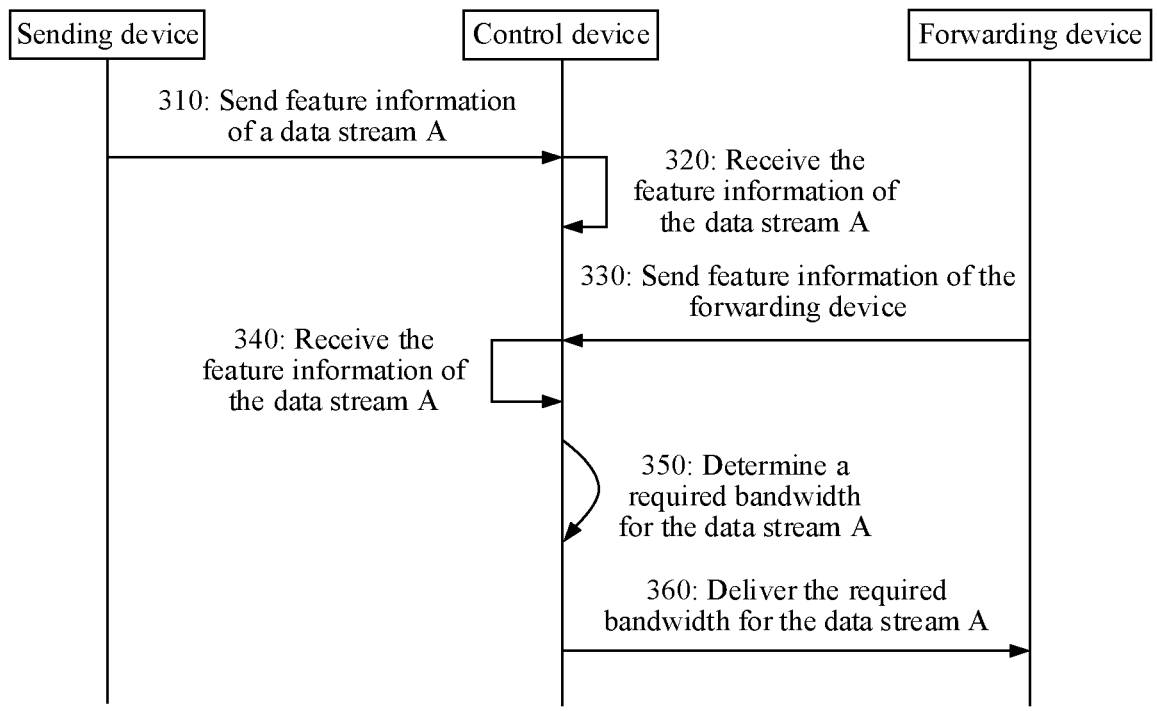
FIG. 3 is a schematic flowchart of a method for determining a required bandwidth for data stream transmission according to an embodiment of this application.

As shown in FIG. 3, a schematic flowchart of a method for determining a required bandwidth for a data stream is provided. A control device in FIG. 3 may be the control device 101 in FIG. 1, and a network device in FIG. 3 may be one or more of the network devices 101 to 105 in FIG. 1. A data stream A in FIG. 3 is a data stream in TSN. A feature of a process of transmitting the data stream A from a sending device to a receiving device meets all requirements or a combination of some requirements defined in the Institute of Electrical and Electronics Engineers (IEEE) 802.1 TSN series standards. The data stream A in the TSN is used as an example below to explain and describe a method for determining and deploying a required bandwidth for the data stream A.

Step 310: The sending device of the data stream A sends feature information of the data stream A to the control device.

The feature information of the data stream includes a service requirement latency of the data stream A from the sending device to the receiving device. The feature information may further include a burst length b, a burst rate $r_p$, or a burst time $t_p$ of the data stream, an average rate r at which the data stream is transmitted, a maximum packet length L of a data stream sent in a specified period, a quantity of data streams with a maximum packet length L that are sent in a specified period, or an accuracy requirement p for transmitting the data stream. A control device may determine, by using the parameter in the feature information, the required bandwidth for transmitting the data stream A.

A method for sending the feature information to the control device by the sending device is described below.

The sending device may send the feature information of the data stream A to the control device by using a data model traffic specification (TSPEC) TLV that is defined by using a UNI or a user to network requirements TLV. Alternatively, the feature information of the data stream A may be sent to the control device by using a TSPEC TLV or a user to network requirements TLV by a user centralized control device that manages the sending device. The data stream A may be a set, for example, the data stream includes a plurality of sub-data streams on a same transmission path.

Figure 6:
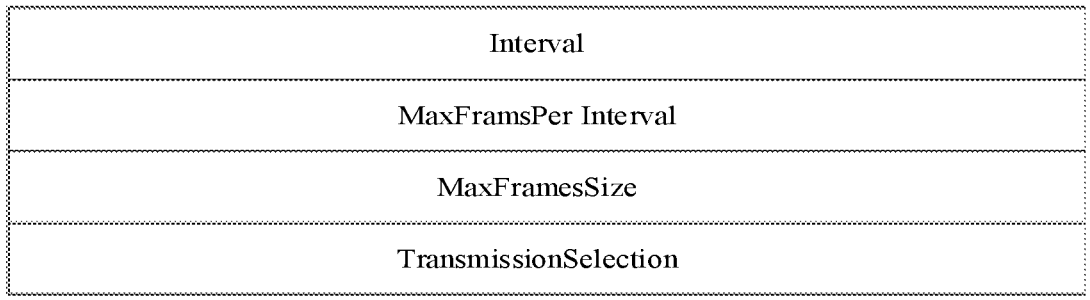
FIG. 6 is a schematic diagram of a packet format in which a type-length-value (TLV) carries feature information of a data stream according to an embodiment of this application.

In an example, FIG. 6 is a schematic diagram of a format in which the TLV carries the feature information of the data stream according to this application. For example, an interval in FIG. 6 may be a period $T_L$ in which the sending device sends a data stream with a maximum packet length L. If statistics are collected on the data stream A by using a value of Interval as a period, a value of MaxFramsPerinterval indicates a quantity $N_L$ of packets with the maximum packet length L that are sent in the data stream A in each period, and a length of each packet cannot exceed a value of MaxFramesSize. The burst length b of the data stream A may be obtained by using a product of the value of MaxFramsPerinterval and the value of MaxFramesSize. The following Table 1 shows a correspondence between a packet format parameter in FIG. 6 and the feature information of the data stream A.

TABLE 1

| Field in the TSPEC TLV | Feature information of the data stream A |
| --- | --- |
| Interval | Period $T_L$ |
| MaxPacketPerInterval * MaxFramesSize | Burst length b |
| MaxFramesSize | Maximum packet length L |

Figure 7:
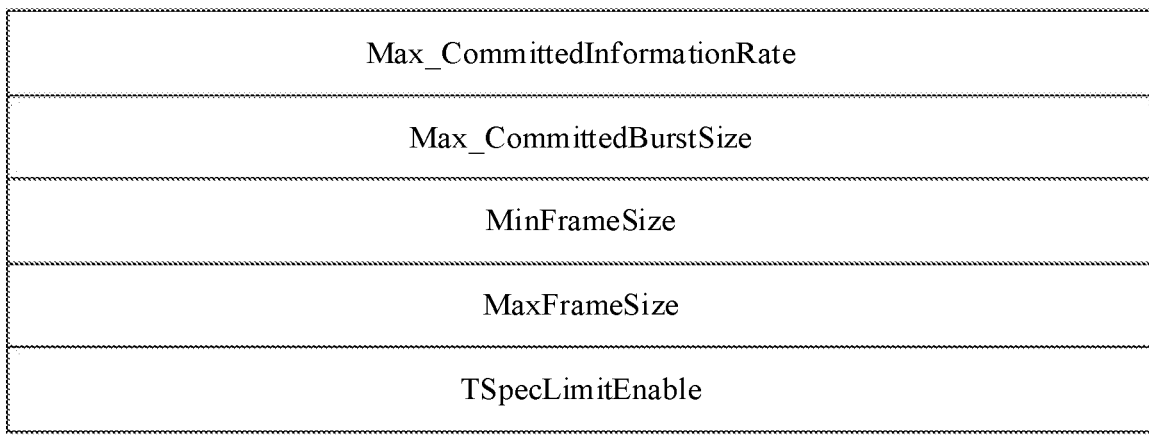
FIG. 7 is a schematic diagram of a packet format in which a TLV carries feature information of a data stream according to an embodiment of this application.

In an example, a new TLV may alternatively be added to the TSPEC to carry the feature information of the data stream A. FIG. 7 is another schematic diagram of a format in which the new TLV is added to carry the feature information of the data stream according to this application. In the newly added TLV shown in FIG. 7, Max_Committed Information Rate (bit/second (s)) and Max_Committed Burst Size (bit) may be used to restrict that the sent data stream A does not exceed values of Max_Committed Information Rate and Max_Committed Burst Size. In other words, this may be understood as that the data stream A is sent by using a token bucket, a rate at which a token is injected into the token bucket is the value corresponding to Max_CommittedInformationRate, and a maximum quantity of tokens that can be contained in the token bucket is the value corresponding Max_CommittedBurstSize, in this way, tokens in the token bucket are not used up. In addition, a length of a packet in the data stream A is not less than a value corresponding to MinFrameSize (bit), and is not greater than a value corresponding to MaxFrameSize (bit). The following Table 2 shows a correspondence between a packet format parameter in FIG. 7 and the feature information of the data stream A.

TABLE 2

| Field in the new TLV added to the TSPEC | Feature information of the data stream A |
| --- | --- |
| Max_CommittedInformationRate | Average rate r |
| Max_CommittedBurstSize | Burst length b |
| MaxFrameSize | Maximum packet length L |

Figure 8:
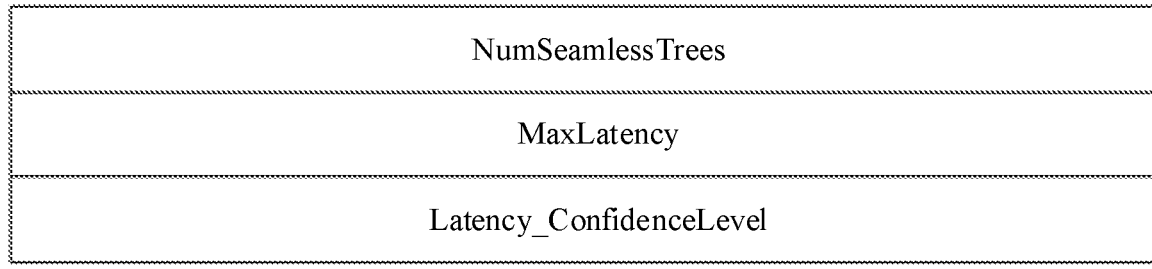
FIG. 8 is a schematic diagram of a packet format in which a TLV carries feature information of a data stream according to an embodiment of this application.

In an example, FIG. 8 is still another schematic diagram of a packet format in which the TLV carries the feature information of the data stream according to this application. A new field is added to a UserToNetworkRequirements TLV shown in FIG. 8. For example, the field is Latency_ConfidenceLevel. If a value of the field is 999900, it means that a user accepts that at 99.99%, a network can ensure that a transmission latency is less than a value of MaxLatency. The following Table 3 shows a correspondence between a packet format parameter in FIG. 8 and the feature information of the data stream A.

TABLE 3

| Field in the new TLV added to the TSPEC | Feature information of the data stream A |
| --- | --- |
| MaxLatency | Latency requirement $d_{obj}$ |
| Latency_ConfidenceLevel | Reliability requirement p |

The TLV that carries the feature information of the data stream A may be used to implement information exchange between the network device and the control device by using a MRP, a LRP, a NETCONF, a RESTCONF, or the like. Methods for transmitting and carrying the feature information of the data stream A based on the foregoing three protocols are described below.

(1) MRP:

The sending device registers the feature information of the data stream into an MRPDU of the sending device, and sends a declaration to the control device. After receiving the declaration, the control device registers (registration) the feature information of the data stream into a database of the control device, and notifies the registration manner in a Multiple Stream Registration Protocol (MSRP) of the control device.

Figure 9:
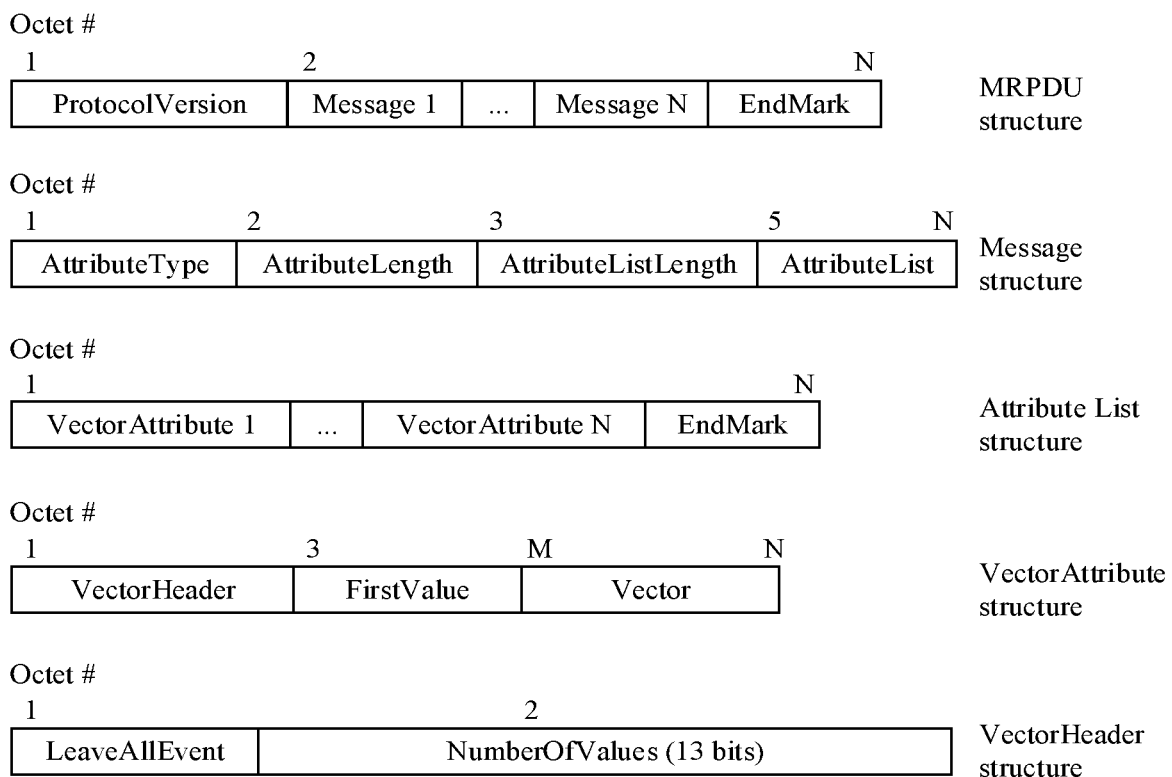
FIG. 9 is a schematic diagram of an MRP data unit (MRPDU) packet format according to an embodiment of this application.

In the foregoing declaration and registration processes, the network device encapsulates the TLV that carries the feature information of the data stream into the MRPDU for transmission. FIG. 9 is a schematic diagram of a structure of an MRPDU packet according to this application. The sending device places a value part in the TLV at a location of FirstValue. Correspondingly, a type value is selected according to a specific protocol definition, and a length value depends on a length of FirstValue.

(2) LRP:

The sending device obtains the feature information of the data stream A from a Resource Allocation Protocol (RAP), registers the feature information of the data stream into an LRP database, and sends a declaration. The declaration includes a TLV carrying the feature information of the data stream. After receiving the declaration, the control device registers (registration) the feature information of the data stream into a database of the control device, and notifies a RAP of the control device.

In the foregoing declaration and registration processes, the sending device encapsulates the TLV that carries the feature information of the data stream into an LRP database (or data unit (DU)) for transmission. FIG. 10 is a schematic diagram of an LRPDU format according to this application. A value part in the TLV is placed at a location corresponding to application data. Correspondingly, a type value is selected according to a protocol definition, and a length value depends on a total length of zero or more records. In a specific transmission process of the LRPDU, transmission may be further performed by using an Edge Control Protocol (ECP) or a Transmission Control Protocol (TCP).

(3) RESTCONF:

The sending device may convert the feature information of the data stream A into a YANG data model, and transmits the feature information between the network device and the control device by using the RESTCONF protocol, where the YANG data model carries the feature information of the data stream A. FIG. 11 is a schematic diagram of the YANG model that carries the feature information of the data stream A according to this application. In FIG. 11, the feature information of the data stream that is carried in the TLV in FIG. 7 is converted into the YANG model, where uint32 in the YANG model carries the feature information of the data stream A.

An occasion on which the sending device sends the feature information of the data stream A may be that when the sending device accesses a network for the first time, the sending device directly or indirectly sends the feature information of the data stream A to the control device, or when the feature information of the data stream A changes, the sending device may directly or indirectly send updated feature information of the data stream A to the control device, or the sending device may send the feature information of the data stream A to the control device according to an instruction of the control device, or the sending device may directly or indirectly send the feature information of the data stream A to the control device based on a specified period.

Step 320: The control device receives the feature information of the data stream A.

The control device may receive the feature information of the data stream A based on a specific implementation in step 310.

In an example, the control device determines, based on stored topology information of the TSN and the feature information of the data stream A, a forwarding path for transmitting the data stream. For example, the control device determines, based on the service requirement latency of the data stream, the path for forwarding the data stream A.

In an example, the control device determines, based on the stored topology information of the TSN and an SLA of the data stream A, the forwarding path for transmitting the data stream.

Step 330: The forwarding device sends feature information of the forwarding device.

One or more network devices on the forwarding path send feature information of the one or more network devices to the control device based on the forwarding path determined in step 320. With reference to FIG. 1, two forwarding devices 104 and 105 are included on the path for transmitting the data stream A, that is, the forwarding devices 104 and 105 separately send network device feature information of the forwarding devices 104 and 105 to the control device.

The feature information of the forwarding device includes a forwarding device transmission latency on the forwarding path and a link transmission latency on the forwarding path. The forwarding latency may further include status information of the forwarding device and capability information of the forwarding device, for example, one or more of a port rate $r_p$ of the forwarding device, a maximum available bandwidth R of a link on the forwarding path, a maximum remaining bandwidth of a link on the forwarding path, a weight of a link on the forwarding path, or a maximum transmission unit (MTU) of a link on the forwarding path. The control device may determine, based on the feature information of the forwarding device, the required bandwidth for transmitting the data stream A.

The feature information of the forwarding device may be directly or indirectly sent to the control device by using the YANG data model. For a YANG data model language, an XML format or a JSON format may be used to describe information, and the control device may parse, by using the NETCONF, the feature information of the data stream in the YANG model. In the NETCONF, a Secure Shell (SSH) protocol, a Transport Layer Security (TLS) protocol, or a TCP may be used to transmit a packet carrying the feature information of the network device. In addition, the feature information of the data stream in YANG data may be parsed by using the RESTCONF.

Step 340: The control device receives the feature information of the network device that transmits the data stream A.

The control device may receive the feature information of the forwarding device based on a possible implementation in step 330.

Step 350: The control device determines the required bandwidth for the data stream A based on the received feature information of the data stream A and the received feature information of the forwarding device.

With reference to the scenario shown in FIG. 1, an example in which the required bandwidth for the data stream A is solved based on the feature information is provided below.

The control device determines, based on the forwarding path of the data stream A, that the network device on the forwarding path includes the forwarding devices 104 and 105, that is, a quantity N=2 of network devices on the forwarding path. The end-to-end service requirement latency of the data stream A that is obtained by the control device based on the feature information of the data stream is $d_{obj}$=2 milliseconds (ms). The transmission latency of each network device on the forwarding path is $T_p$=0.075 ms. $T_p$ is used to describe the network device transmission latency of each network device on the forwarding path, for example, the network device transmission latency on the forwarding path in FIG. 1 includes the network device transmission latencies of the two forwarding devices: the forwarding device 104 and the forwarding device 105, that is, a value is $2T_p$=0.15 ms. The link transmission latency on the forwarding path is $T_{fix}$=1 ms. $T_{fix}$ is used to describe the end-to-end link transmission latency of the data stream, for example, $T_{fix}$ in FIG. 1 is used to describe the link transmission latency of the data stream from the sending device 102 to the receiving device 103. A sum of the network device transmission latency and the link latency on the forwarding path that are obtained based on $d_{fix}=T_{fix}+NT_p$ is 1.15 ms, N is the quantity of forwarding devices on the forwarding path, and N is 2 with reference to FIG. 1.

The control device may obtain, from the sending device, the burst length b=1000 bytes of the data stream A, or may obtain the burst length b based on a product of a quantity of packets with the maximum packet length L that are sent by the sending device and the maximum packet length L.

According to the foregoing parameters and the formula $B_d=b/(d_{obj} d_{fix})$ or a formula of an equivalent variation of the formula, the required bandwidth for transmitting the data stream A is solved as $B_d$=9.4 megabits per second (Mbps).

Step 360: The control device delivers, to the forwarding device, the required bandwidth for transmitting the data stream A.

The control device delivers an indication message to the one or more network devices on the forwarding path, where the indication message carries the required bandwidth for transmitting the data stream A. The indication message is used to indicate the forwarding device to reserve, for the data stream A, a bandwidth equal to the required bandwidth, or the indication message is used to indicate the forwarding device to transmit the data stream A by using the required bandwidth. With reference to FIG. 1, the control device delivers a required bandwidth value for the data stream A to the forwarding device 104 or the forwarding device 105, so that the forwarding device 104 or the forwarding device 105 forwards the data stream A by using the required bandwidth.

FIG. 12 is a schematic diagram of a structure of YANG that carries the feature information of the network device according to this application. A traffic shaping (Asynchronous Traffic Shaping (ATS)) scheduling method defined in TSN in 802.1 is used as an example. As shown in FIG. 12, the control device may configure the required bandwidth in a YANG model parameter committed-information-rate field, where the field is readable and writable, for example, unit64. For another scheduling method, the feature information of the forwarding device may be configured at another parameter location of the YANG model.

For the YANG data model language, the XML format or the JSON format may be used to describe information, and the control device may parse, by using the NETCONF, the feature information of the data stream in the YANG model. In the NETCONF, the SSH protocol, the TLS protocol, or the TCP may be used to transmit a packet carrying the feature information of the network device. In addition, the feature information of the data stream in YANG data may be parsed by using the RESTCONF.

In an example, for a forwarding device that uses a weighted fair queuing (WFQ) or dynamic rate repartitioning (DRR) scheduling method, the control device or the network device may plan a network slice based on the required bandwidth for the data stream A.

To meet a service latency constraint, the required bandwidth for transmitting the data stream is determined by using the foregoing method, to ensure that a service meets the latency constraint, and guide parameter configuration in bounded latency service scenarios such as smart grid differential protection such as network slicing and an industrial automation network.

Step 370: The control device sends acknowledgment or charging information to a transmit end device based on the determined required bandwidth.

The control device sends the determined required bandwidth for the data stream A to a user based on the service requirement latency of the data stream A. The control device sends the charging information to the user based on the service requirement latency of the data stream A and the required bandwidth.

Figure 13:
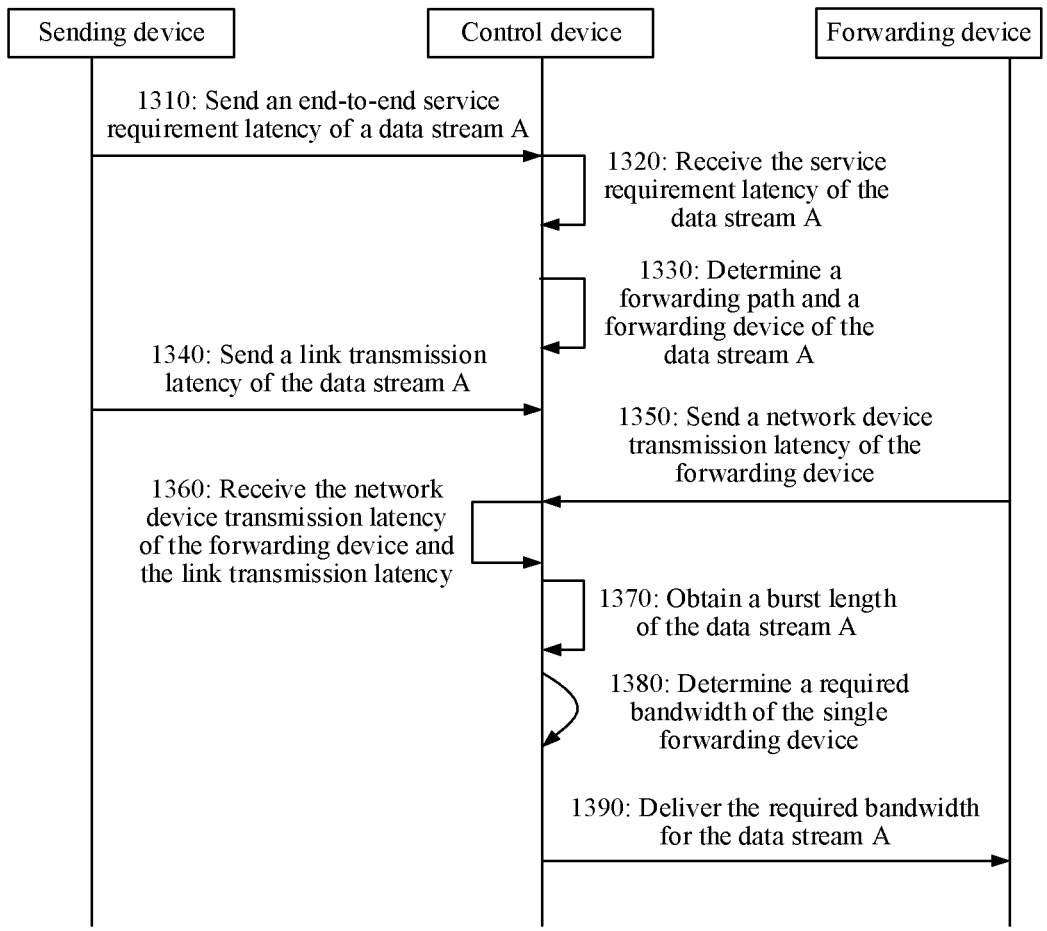
FIG. 13 is a schematic flowchart of a method for determining a required bandwidth for data stream transmission according to an embodiment of this application.

FIG. 13 is a schematic flowchart of another method for determining a required bandwidth for a data stream according to this application. A control device in FIG. 13 may be the control device 101 in FIG. 1, and a network device or a forwarding device in FIG. 13 may be one of the network devices 101 to 105 in FIG. 1. A data stream A in FIG. 13 is a data stream in TSN. The data stream A in the TSN is used as an example below to explain and describe a method for determining and deploying a required bandwidth for the data stream A.

Step 1310: A network device that sends the data stream A sends, to the control device, a service requirement latency $d_{obj}$ of end-to-end transmission of the data stream A.

For a method for sending the service requirement latency of the data stream A to the control device by the network device, refer to the manner in step 310 in FIG. 3. Details are not described herein again.

Step 1320: The control device receives the service requirement latency $d_{obj}$ of the data stream A.

Step 1330: The control device determines a forwarding path of the data stream A and a forwarding device on the forwarding path.

The control device may determine the forwarding path and the forwarding device on the forwarding path based on a known network topology and a feature of the data stream A. The control device may alternatively determine the forwarding path for forwarding the data stream A and the forwarding device on the forwarding path based on the service requirement latency of the data stream A. For example, when there is a plurality of forwarding paths for forwarding the data stream, the control device may select an appropriate path from the plurality of paths based on the service requirement latency of the data stream A.

Step 1340: The forwarding device on the forwarding path sends, to the control device, a link transmission latency $T_{fix}$ of end-to-end transmission of the data stream A.

For the link transmission latency of transmitting the data stream A, the link transmission latency of the data stream A may be determined based on descriptions of step 220 in FIG. 2 in FIG. 4, and the link transmission latency of the data stream A may be described by $T_{fix}$.

Step 1350: Each forwarding device on the forwarding path sends a transmission latency $d_{device}$ of the forwarding device to the control device.

For a manner in which the forwarding device sends the transmission latency of the forwarding device and the link transmission latency to the control device, refer to the manners in step 220 and step 320. The transmission latency of the forwarding device may be a processing latency represented by the digit 4 in FIG. 4.

Step 1360: The control device receives a network device transmission latency $d_{device}$ and a link transmission latency $T_{fix}$ of a single forwarding device.

The control device receives the forwarding device transmission latency of the single forwarding device and the end-to-end link transmission latency of the data stream A.

Step 1370: The control device obtains a burst length of the data stream A.

The control device may directly receive the burst length of the data stream A, or may calculate the burst length of the data stream A based on another parameter. For details, refer to related descriptions of calculating the burst length of the data stream in step 230.

Step 1380: The control device determines a required bandwidth of each forwarding device on the forwarding path.

The control device solves the required bandwidth for the data stream A based on $B_d = b/(d_{obj\text{-}per} - d_{device})$. $B_d$ indicates a value of the required bandwidth of the single network device on the forwarding path. b indicates a value of the burst length of the data stream. $d_{obj\text{-}per}$ indicates a value of a service requirement latency of the single network device on the forwarding path. $d_{device}$ indicates the network device transmission latency of the single network device on the forwarding path.

In an example, there are a plurality of manners of obtaining the value of $d_{obj\text{-}per}$. First, required latencies of forwarding the data stream A by all forwarding devices on the forwarding path may be obtained based on a difference between the service requirement latency $d_{obj}$ of the data stream A and the link transmission latency $T_{fix}$ of the data stream A. The control device may allocate the difference between $d_{obj}$ and $T_{fix}$ to each network device on the forwarding path in a specific proportion, to obtain the service requirement latency of each network device, that is, obtain $d_{obj\text{-}per}$. For example, the control device evenly allocates the difference between $d_{obj}$ and $T_{fix}$ to the network device on the forwarding path, and the control device may further allocate, to each network device on the forwarding path based on a requirement and an application scenario, the difference between $d_{obj}$ and $T_{fix}$ in a specific proportion, to obtain the service requirement latency of the single network device, that is, obtain $d_{obj\text{-}per}$.

Step 1390: The control device delivers the required bandwidth of each forwarding device to the corresponding forwarding device.

The control device delivers the required bandwidth of each forwarding device to the corresponding device based on the required bandwidth of the forwarding device that is determined in step 1380, so that the forwarding device configures a bandwidth resource for the data stream based on the required bandwidth. For a specific manner in which the control device delivers the required bandwidth, refer to the manner in step 350.

Figure 14:
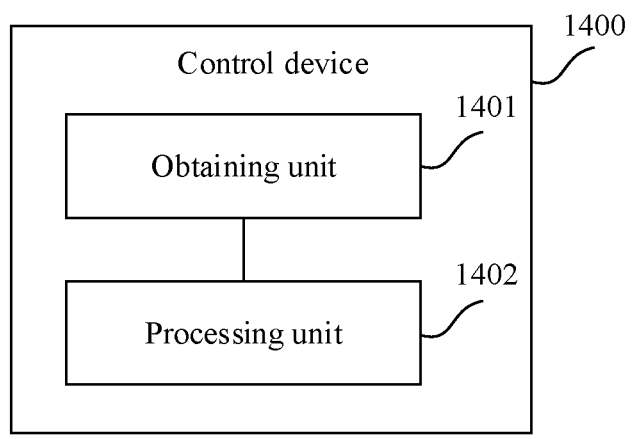
FIG. 14 is a schematic diagram of a structure of a control device according to an embodiment of this application.

FIG. 14 is a possible schematic diagram of a structure of the control device in the foregoing embodiments. The control device 1400 may implement functions of the control device in the embodiments shown in FIG. 2, FIG. 3, and FIG. 13. For example, the control device may perform steps 210 to 230 in FIG. 2, or perform step 320 and steps 340 and 350 in FIG. 3, or perform steps 1320 and 1330 and steps 1360 to 1390 in FIG. 13. For functions of units of the control device 1400, refer to descriptions in the steps in the foregoing methods.

Refer to FIG. 14. The control device 1400 includes an obtaining unit 1401 and a processing unit 1402. The obtaining unit 1401 is configured to obtain a service requirement latency of transmitting a data stream from a first network device to a second network device, a network device transmission latency on a forwarding path, and a link transmission latency on the forwarding path, where the forwarding path is a path through which the data stream is transmitted from the first network device to the second network device. The processing unit 1402 is configured to determine, based on the service requirement latency, the network device transmission latency on the forwarding path, and the link transmission latency on the forwarding path, a required bandwidth for transmitting the data stream.

In an example, the network device transmission latency on the forwarding path includes one or more of a processing latency of a network device on the forwarding path, an output latency of the network device on the forwarding path, a preemption latency of the network device on the forwarding path, or a scheduling latency of the network device on the forwarding path. For details, refer to descriptions of FIG. 4 in step 220 in FIG. 2.

In an example, the required bandwidth satisfies the following condition: a latency of transmitting the data stream by the network device on the forwarding path along the forwarding path based on the required bandwidth is less than or equal to the service requirement latency.

In an example, the processing unit 1402 is configured to determine the required bandwidth for the data stream based on a difference between the service requirement latency and the network device transmission latency and the link transmission latency on the forwarding path.

In an example, the obtaining unit 1401 is further configured to obtain a burst length of the data stream. The processing unit 1402 is configured to obtain the required bandwidth for the data stream by using the following relationship:

$$B_d = b/(d_{obj} - d_{fix}).$$

$B_d$ indicates a value of the required bandwidth. b indicates a value of the burst length. $d_{obj}$ indicates a value of the service requirement latency. $d_{fix}$ indicates the network device transmission latency and the link transmission latency on the forwarding path.

In an example, the network device on the forwarding path includes one or more network devices configured to forward. The one or more network devices do not include the first network device or the second network device, or the one or more network devices include the first network device, or the one or more network devices include the second network device, or the one or more network devices include the first network device and the second network device.

In an example, the control device includes a receiving unit. The obtaining unit 1401 is configured to obtain the burst length from the receiving unit. Alternatively, the obtaining unit 1401 obtains the burst length from the processing unit 1402. The processing unit 1402 uses a value of a product of a burst rate and a burst time of the data stream as the burst length and sends the burst length to the obtaining unit 1401. For the data stream, a value of a product of a packet length of a packet sent in the data stream in a specified period and a quantity of sent packets is used as the burst length, and the burst length is sent to the obtaining unit 1401.

In an example, the obtaining unit 1401 may obtain the service requirement latency, or the network device transmission latency and the link transmission latency on the forwarding path from an MRP packet, an LRP packet, a NETCONF packet, a RESTCONF packet, or an MIB packet.

In an example, the processing unit 1402 is further configured to, before the obtaining unit obtains the network device transmission latency and the link transmission latency on the forwarding path, determine, based on the service requirement latency of the data stream, the path for transmitting the data stream.

In an example, the control device further includes a sending unit. The sending unit is configured to send indication information to the network device on the path, where the indication information is used to indicate the network device on the path to transmit the data stream based on the required bandwidth.

In an example, the sending unit is further configured to send the indication information to a CUC device, so that the CUC device sends the indication information to the network device on the path.

In an example, a value of the required bandwidth is less than or equal to a maximum bandwidth of the network device on the forwarding path.

It should be noted that, in this embodiment of this application, unit division is an example, and is merely logical function division. During actual implementation, another division manner may be used. Functional units in the embodiments of this application may be integrated in one processing unit 1402, or each unit may exist alone physically, or two or more units are integrated into one unit. For example, in the foregoing embodiments, the receiving unit and the sending unit may be a same unit or different units. The integrated unit may be implemented in a form of hardware, or may be implemented in a form of a software function unit.

Figure 15:
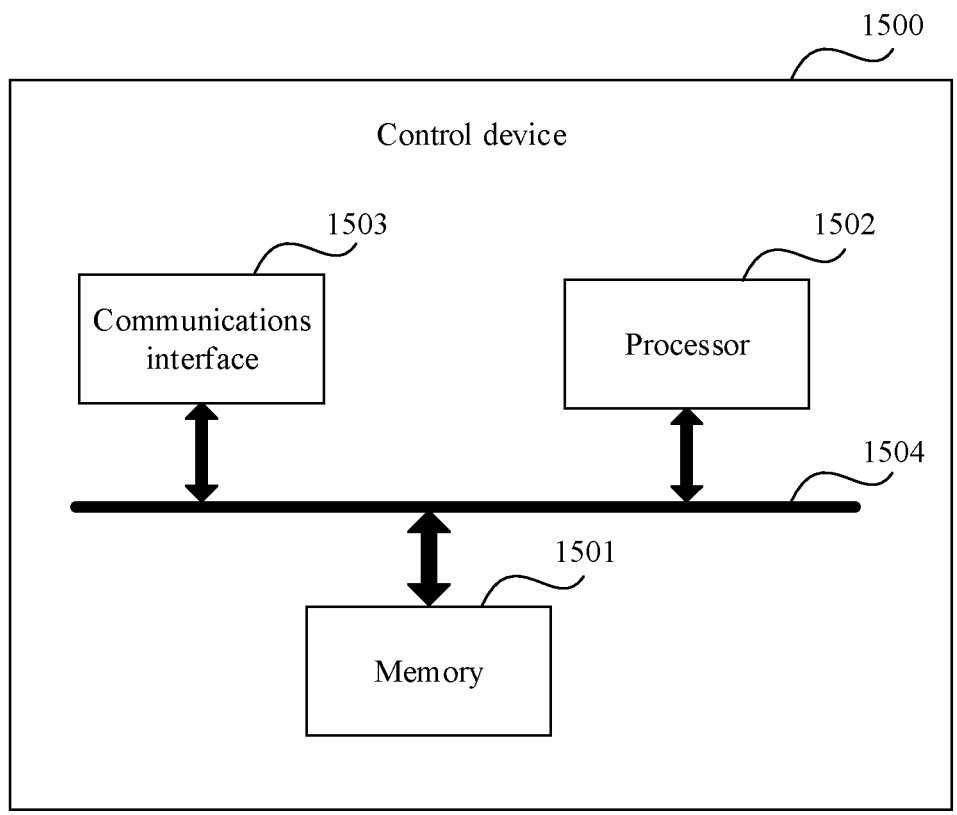
FIG. 15 is a schematic diagram of a structure of a control device according to an embodiment of this application.

FIG. 15 is a schematic diagram of a structure of a control device according to an embodiment of this application. The control device 1500 includes a processor 1502, a communications interface 1503, a memory 1501, and a bus 1504. The communications interface 1503, the processor 1502, and the memory 1501 are connected to each other by using the bus 1104. The bus 1504 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus. The control device 1500 may implement functions of the control device in the embodiments shown in FIG. 2, FIG. 3, and FIG. 13. The processor 1502 and the communications interface 1503 may perform corresponding functions of the control device in the foregoing method examples. The communications interface 1503 is configured to support the control device 1500 in performing steps 210 and 220 in FIG. 2, or performing step 320, step 340, and step 360 in FIG. 3, or performing step 1320, step 1360, and step 1390 in FIG. 13. The processor 1502 is configured to support the control device 1500 in performing step 230 in FIG. 2, or performing step 350 in FIG. 3, or performing step 1330, step 1360, step 1370, and step 1380 in FIG. 13. Step 1370 in FIG. 13 may be performed by the communications interface 1503, or may be performed by the processor 1502. The memory 1501 is configured to store program code and data of the control device 1500.

The following further describes each component of the control device with reference to FIG. 15.

The memory 1501 may be a volatile memory, for example, a random-access memory (RAM), or a non-volatile memory, for example, a read-only memory (ROM), a flash memory, a hard disk drive (HDD), or a solid-state drive (SSD), or a combination of the foregoing types of memories configured to store program code that can implement the method in this application, a configuration file of a network device in a TSN domain, or other content.

The processor 1502 is a control center of the control device, and may be a central processing unit (CPU), or may be an application-specific integrated circuit (ASIC), or one or more integrated circuits configured to implement the embodiments of this application, for example, one or more digital signal processors (DSPs), or one or more field-programmable gate arrays (FPGAs).

The communications interface 1503 is configured to communicate with a network device, for example, to obtain an end-to-end service requirement latency of a data stream, a network device transmission latency on a forwarding path of the data stream, and a link transmission latency on the forwarding path. For example, the service requirement latency of the data stream may be obtained by using an MRP packet, an LRP packet, a NETCONF packet, a RESTCONF packet, or an MIB packet. The communications interface 1503 may be an Ethernet interface, a Fast Ethernet (FE) interface, or a Gigabit Ethernet (GE) interface.

In an example, the communications interface 1503 is configured to receive a burst length of the data stream.

In an example, the communications interface 1503 is configured to send indication information to a network device on the forwarding path of the data stream, where the indication information carries a required bandwidth for the data stream. The indication information is used to indicate the network device on the path to transmit the data stream based on the required bandwidth, and reserve a bandwidth resource for the data stream.

In a possible implementation, the control device may be configured as the control device 101 in FIG. 1. The processor 1502 runs or executes a software program and/or a module stored in the memory 1501, and invokes data stored in the memory 1501, to perform the following function: determining, based on the service requirement latency, the network device transmission latency on the forwarding path, and the link transmission latency on the forwarding path, the required bandwidth for transmitting the data stream.

In a possible implementation, the processor 1502 is configured to determine the required bandwidth for the data stream based on a difference between the service requirement latency and the network device transmission latency and the link transmission latency on the forwarding path.

In a possible implementation, the processor 1502 is further configured to obtain the burst length of the data stream. The processor 1502 is configured to obtain the required bandwidth for the data stream by using the following relationship:

$$B_d = b/(d_{obj} - d_{fix}).$$

$B_d$ indicates a value of the required bandwidth. b indicates a value of the burst length. $d_{obj}$ indicates a value of the service requirement latency. $d_{fix}$ indicates the network device transmission latency and the link transmission latency on the forwarding path.

In a possible implementation, the processor 1502 uses a value of a product of a burst rate and a burst time of the data stream as the burst length, or uses a value of a product of a packet length of a packet sent in the data stream in a specified period and a quantity of sent packets as the burst length.

In a possible implementation, the processor 1502 is further configured to, before the communications interface 1503 obtains the network device transmission latency and the link transmission latency on the forwarding path, determine, based on the service requirement latency of the data stream, the path for transmitting the data stream.

For a specific execution process, refer to detailed descriptions of corresponding steps in the embodiments shown in FIG. 2, FIG. 3, and FIG. 13. Details are not described herein again.

Figure 16:
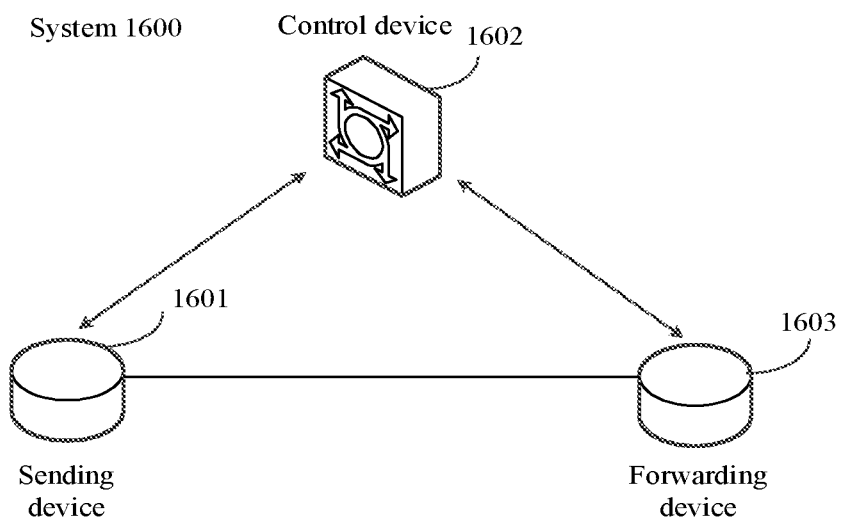
FIG. 16 is a schematic diagram of a structure of a system for determining a required bandwidth for data stream transmission according to an embodiment of this application.

FIG. 16 shows a system 1600 for determining a required bandwidth for data stream transmission according to this application. The system includes a sending device 1601, a control device 1602, and a forwarding device 1603. The system 1600 is configured to implement the method for determining a required bandwidth for a data stream in the foregoing method embodiments. The control device 1602 may implement functions of the control device in the embodiment shown in FIG. 2, FIG. 3, or FIG. 13. The sending device 1601 may implement functions of the sending device in the embodiment shown in FIG. 3 or FIG. 13. The forwarding device 1603 may implement functions of the forwarding device in the embodiments shown in FIG. 3 and FIG. 13. For example, the sending device 1601 is configured to send a service requirement latency of a data stream or other feature information of the data stream to the control device. The forwarding device 1602 is configured to send a network device transmission latency and a link transmission latency on a forwarding path of the data stream to the control device. The control device 1603 is configured to determine, based on the service requirement latency of the data stream and the network device transmission latency and the link transmission latency on the forwarding path of the data stream, a required bandwidth for transmitting the data stream. For a specific execution process, refer to detailed descriptions of corresponding steps in the embodiment shown in FIG. 2, FIG. 3, or FIG. 13. Details are not described herein again.

It should be noted that any apparatus embodiment described above is merely an example. The units described as separate parts may or may not be physically separate, and parts displayed as units may or may not be physical units, may be located at one position, or may be distributed on a plurality of network units. Some or all the modules may be selected according to an actual need to achieve the objectives of the solutions of the embodiments. In addition, in the accompanying drawings of the embodiments of the first network device or the control device provided in this application, connection relationships between the modules indicate that the modules have communication connections with each other, and the communication connection may be further implemented as one or more communications buses or signal lines. A person of ordinary skill in the art may understand and implement the embodiments without creative efforts.

Methods or algorithm steps described in the content disclosed in the embodiments of this application may be implemented by hardware, or may be implemented by a processor by executing software instructions. The software instructions may include a corresponding software module. The software module may be stored in a RAM, a flash memory, a ROM, an erasable programmable ROM (EPROM), an electrically EPROM (EEPROM), a hard disk, a removable hard disk, a compact disc (CD), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   obtaining a first latency, wherein the first latency is a service requirement latency of transmitting a data stream from a first network device to a second network device;
   obtaining a second latency, wherein the second latency comprises a sum of a network device transmission latency on a forwarding path and a link transmission latency on the forwarding path, and wherein the forwarding path is a path of the data stream from the first network device to the second network device;
   obtaining a burst length of the data stream; and
   calculating, based on the first latency, the second latency, and the burst length, a required bandwidth for transmitting the data stream.

2. The method of claim 1, wherein the network device transmission latency comprises one or more of a processing latency of a network device on the forwarding path, an output latency of the network device, a preemption latency of the network device, or a scheduling latency of the network device.

3. The method of claim 1, wherein the required bandwidth satisfies that a latency of transmitting the data stream by a network device on the forwarding path along the forwarding path based on the required bandwidth is less than or equal to the first latency.

4. The method of claim 1, further comprising:
   obtaining a third latency, wherein a third value of the third latency is a difference between a first value of the first latency and a second value of the second latency; and
   obtaining, based on the third latency, a fourth value of the required bandwidth.

5. The method of claim 1, further comprising:
   obtaining a burst length of the data stream; and
   obtaining the required bandwidth using a formula, wherein the formula is:

$$B_d = \frac{b}{d_{obj} - d_{fix}},$$

wherein $B_d$ indicates the required bandwidth,
   wherein b indicates the burst length,
   wherein $d_{obj}$ indicates the first latency, and
   wherein $d_{fix}$ indicates the second latency.

6. The method of claim 5, further comprising:
   receiving the burst length; and
   either:
      obtaining a burst rate of the data stream and a burst time of the data stream and setting a first value of a first product of the burst rate and the burst time as the burst length; or
      obtaining a packet length of a packet sent in the data stream in a period and a quantity of sent packets and setting a second value of a second product of the packet length and the quantity of sent packets as the burst length.

7. The method of claim 1, wherein a network device on the forwarding path comprises one or more network devices configured to forward the data stream, and wherein:
   the one or more network devices do not comprise the first network device or the second network device;
   the one or more network devices comprise the first network device;
   the one or more network devices comprise the second network device; or
   the one or more network devices comprise the first network device and the second network device.

8. The method of claim 1, further comprising further obtaining the first latency or the second latency using one of the following packets:
   a Multiple Registration Protocol (MRP) packet;
   a Link-local Registration Protocol (LRP) packet;
   a Network Configuration Protocol (NETCONF) packet;
   a Representational State Transfer Network Configuration Protocol (RESTCONF) packet;
   a Simple Network Management Protocol (SNMP) packet; or
   a management information base (MIB) packet.

9. The method of claim 1, wherein before obtaining the second latency, the method further comprises identifying, based on the service requirement latency, the forwarding path for transmitting the data stream.

10. The method of claim 1, further comprising sending, to a network device on the forwarding path, indication information indicating the network device to transmit the data stream based on the required bandwidth.

11. The method of claim 10, further comprising further sending, to the network device and using a centralized user configuration device, the indication information.

12. A control device comprising:
a non-transitory memory configured to store instructions; and
one or more processors coupled to the non-transitory memory, wherein the instructions, when executed by the one or more processors, cause the control device to:
obtain a first latency, wherein the first latency is a service requirement latency of transmitting a data stream from a first network device to a second network device;
obtain a second latency, wherein the second latency comprises a sum of a network device transmission latency on a forwarding path and a link transmission latency on the forwarding path, wherein the forwarding path is a path of the data stream from the first network device to the second network device;
obtain a burst length of the data stream; and
calculate, based on the first latency, the second latency, and the burst length, a required bandwidth for transmitting the data stream.

13. The control device of claim 12, wherein the network device transmission latency comprises one or more of a processing latency of a network device on the forwarding path, an output latency of the network device, a preemption latency of the network device, or a scheduling latency of the network device.

14. The control device of claim 12, wherein the required bandwidth satisfies that a latency of transmitting the data stream by a network device on the forwarding path along the forwarding path based on the required bandwidth is less than or equal to the first latency.

15. The control device of claim 12, wherein the instructions, when executed by the one or more processors, further cause the control device to:
obtain a third latency, wherein a third value of the third latency is a difference between a first value of the first latency and a second value of the second latency; and
obtain, based on the third latency, a fourth value of the required bandwidth.

16. The control device of claim 12, wherein the instructions, when executed by the one or more processors, further cause the control device to:
obtain a burst length of the data stream; and
obtain the required bandwidth using a formula, wherein the formula is:

$$B_d = \frac{b}{d_{obj} - d_{fix}},$$

wherein $B_d$ indicates the required bandwidth,
wherein b indicates the burst length,
wherein $d_{obj}$ indicates the first latency, and
wherein $d_{fix}$ indicates the second latency.

17. The control device of claim 16, wherein the instructions, when executed by the one or more processors, further cause the control device to:
receive the burst length;
obtain, based on a first product of a burst rate of the data stream and a burst time of the data stream, the burst length; or
obtain, based on a packet length of a packet sent in the data stream in a period and a quantity of sent packets, the burst length.

18. The control device of claim 12, wherein a network device on the forwarding path comprises one or more network devices configured to forward the data stream, and wherein:
the one or more network devices do not comprise the first network device or the second network device;
the one or more network devices comprise the first network device;
the one or more network devices comprise the second network device; or
the one or more network devices comprise the first network device and the second network device.

19. The control device of claim 12, wherein the instructions, when executed by the one or more processors, further cause the control device to:
obtain the first latency or the second latency using one of the following packets:
a Multiple Registration Protocol (MRP) packet;
a Link-local Registration Protocol (LRP) packet;
a Network Configuration Protocol (NETCONF) packet;
a Representational State Transfer Network Configuration Protocol (RESTCONF) packet; or
a management information base (MIB) packet; and
identify, based on the service requirement latency, the forwarding path for transmitting the data stream before obtaining the second latency.

20. A computer program product comprising computer-executable instructions that are stored on a non-transitory computer-readable medium and that, when executed by one or more processors, cause a control device to:
obtain a first latency, wherein the first latency is a service requirement latency of transmitting a data stream from a first network device to a second network device;
obtain a second latency, wherein the second latency comprises a sum of a network device transmission latency on a forwarding path and a link transmission latency on the forwarding path, and wherein the forwarding path is a path of the data stream from the first network device to the second network device;
obtain a burst length of the data stream; and
calculate, based on the first latency, the second latency, and the burst length, a required bandwidth for transmitting the data stream.

* * * * *